Sept. 24, 1968     S. R. GOLDSTEIN     3,402,737
FLUID PRESSURE MODULATING SERVO VALVE
Filed Sept. 2, 1966     3 Sheets-Sheet 1
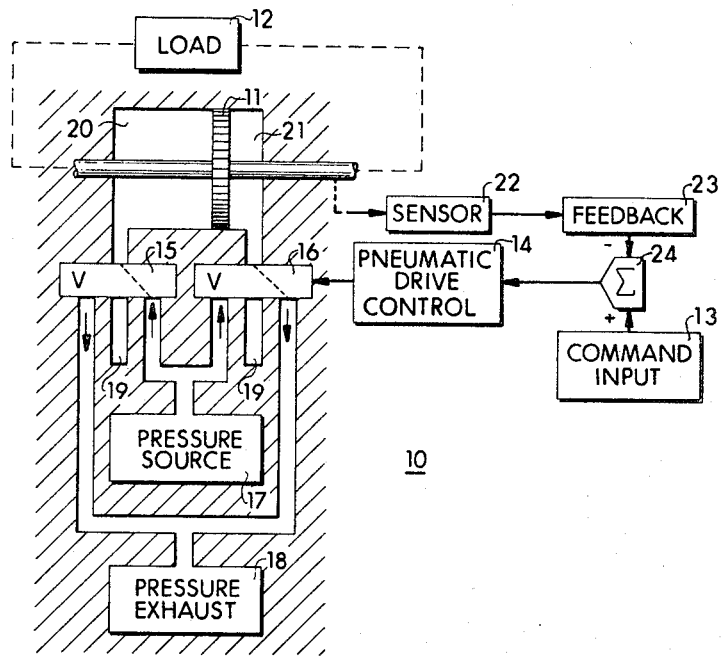
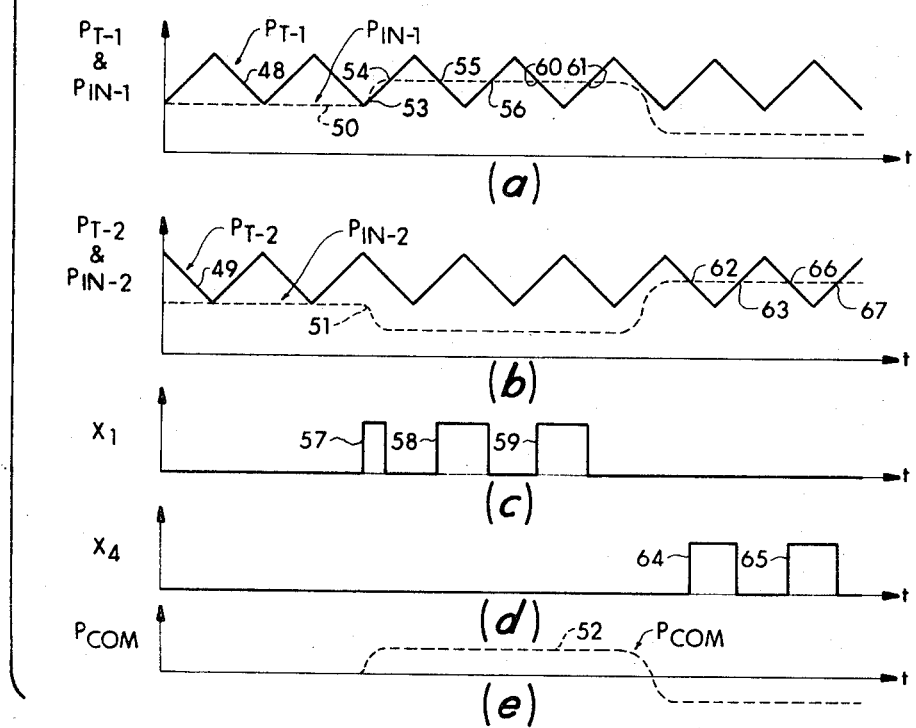
INVENTOR
SETH R. GOLDSTEIN
BY Thomas Cooch
Martin M. Santa
Robert F. O'Connell
ATTORNEYS

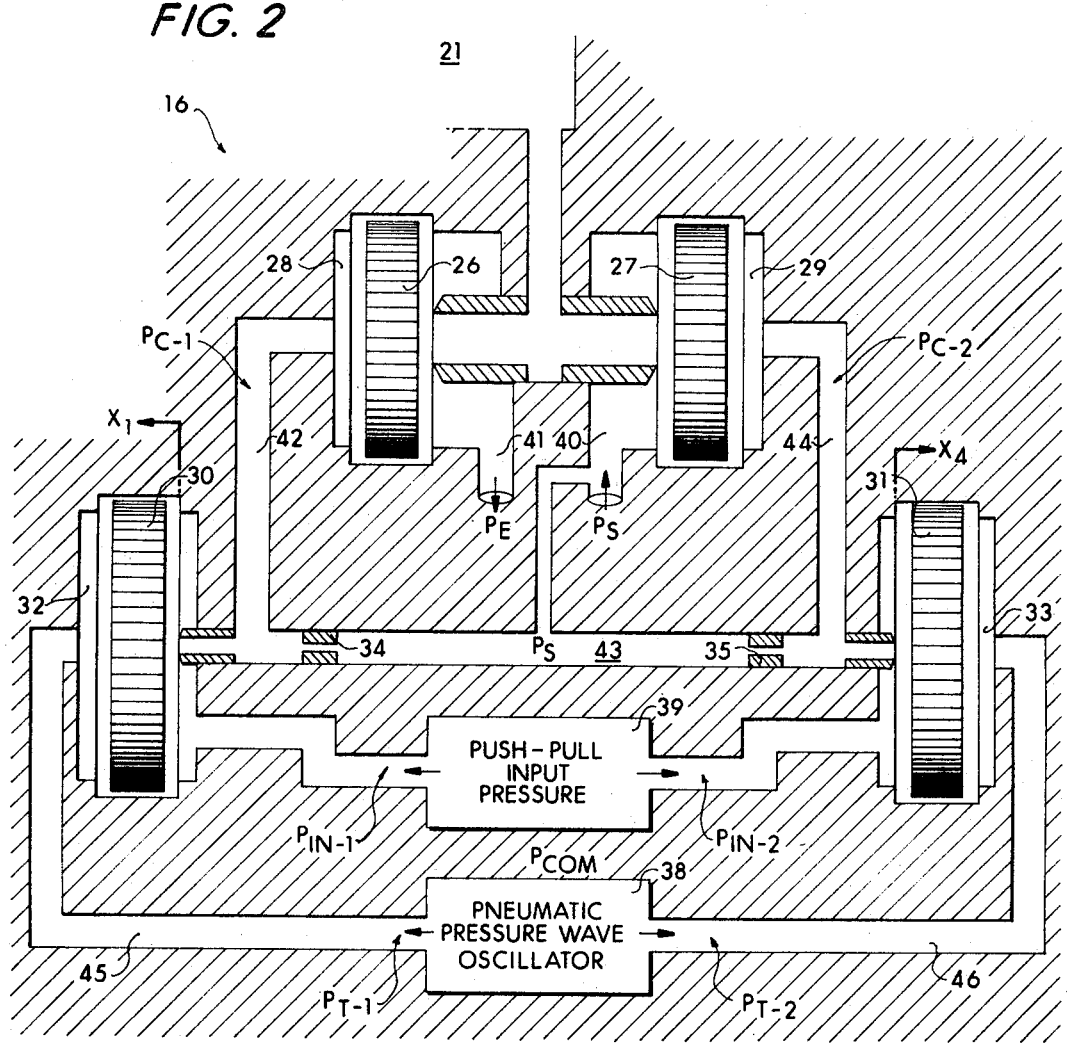

Sept. 24, 1968  S. R. GOLDSTEIN  3,402,737
FLUID PRESSURE MODULATING SERVO VALVE
Filed Sept. 2, 1966  3 Sheets-Sheet 3

INVENTOR
SETH R. GOLDSTEIN
BY Thomas Cooch
Martin M. Santa
Robert F. O'Connell
ATTORNEYS

United States Patent Office 3,402,737
Patented Sept. 24, 1968

3,402,737
FLUID PRESSURE MODULATING SERVO VALVE
Seth R. Goldstein, Waltham, Mass., assignor to Massachusetts Institute of Technology, Cambridge, Mass., a corporation of Massachusetts
Filed Sept. 2, 1966, Ser. No. 576,901
8 Claims. (Cl. 137—596.14)

ABSTRACT OF THE DISCLOSURE

A two-stage, servo valve system in which a first pair of floating disks moves in response to a pair of modulating pressure wave signals having specified pressure wave shapes as a function of time and to a pair of push-pull input pressure signals generated from an input command signal. The motions of a second pair of floating disks are responsive to the motions of such first pair of disks so that the supply of pressure from a pressure system to the outlet port of the valve is thereby controlled, such pressure being used to cause an output load to move in a first direction, in a second opposite direction, or to remain substantially in a fixed position.

---

This invention relates generally to fluid actuated valves, or switches, for use in servo systems and, more particularly, to a pneumatically actuated two-stage valve operating in accordance with a unique pulse length modulation scheme.

In many servo system applications, because of increasingly severe environmental conditions under which such systems are required to operate, it is desirable to avoid the use of electrical components. In many aerospace systems, for example, the necessity for high reliability, the difficulty in using electrical systems because of the presence of environmental radiation, and the ability to utilize the products of combustion of a rocket or a jet engine have all combined to stimulate interest in using servo systems which are substantially completely fluid actuated with relatively few or no electrical elements.

While some systems have successfully utilized various hydraulic fluids for actuation, many conditions of operation make it preferable to take advantage of pneumatic, or gas actuated, systems. While air may in many instances preferably be used in such systems, the term "pneumatic" as used herein will refer generally to the use of any gaseous substance, including air. Pneumatic systems can function in extreme radiation and temperature environments and their properties are not so easily influenced by changes in that environment as are hydraulic fluid systems. Moreover, those pneumatic systems which use air as the driving force are relatively less expensive, require no special materials for containing the air, or other gas, supply and produce no catastrophes in the event of leakage. Moreover, no return line or sump systems are necessary.

These advantages make pneumatic systems more applicable in many situations than comparable electro-mechanical or purely hydraulic fluid servo systems.

In pneumatic servo systems that have been previously developed, however, high quiescent power consumption and the failure of some components therein, such as bellows, flexures, diaphragms, springs, and the like, to operate properly at high temperatures have caused much difficulty.

The particular system described in this invention, is particularly adaptable for use in pneumatic applications, although not limited thereto, and overcomes the above mentioned difficulties because it uses essentially no power during quiescent operation and utilizes no temperature sensitive movable mechanical parts such as bellows, flexures, diaphragms and springs. The only movable elements in the system of the invention are relatively thin disks freely floating within suitable housings, such elements being operable over wide temperature ranges with little difficulty. The system possesses excellent power efficiency and high reliability with performance comparable to available pneumatic, hydraulic or electro-mechanical servo systems.

In general, the system of this invention utilizes a two-stage valve, or switch for controlling the application of pneumatic power to a load by connecting a ram chamber, for example, either to a pneumatic pressure supply system, to a pneumatic exhaust system or sealing it off from either the pressure or the exhaust systems. Because of the presence of this third, shut-off position, no power is consumed under quiescent, or zero command input, conditions, as explained in more detail below. Since substantially all of the pressure supply power during ram actuation is used to move the ram and since substantially no pressure supply power is used during quiescent operation, the overall efficiency if the systems is very high.

More particularly, in a preferred embodiment of the valve system of the invention a first pair of primary floating disks is controlled by a second pair of secondary floating disks which in turn generate a particular pulse length modulated motion in response to an input command signal. Such modulation scheme utilizes a pneumatic oscillator for supplying a pair of pressure signals which in a preferred embodiment have triangular wave shapes and which are fed to one side of each of the secondary control disks, respectively. The other sides of such disks are fed, respectively, with a pair of push-pull input pressure signals derived from an input command signal. The motion of the secondary floating disks within their housings is a function of the difference between the triangular and input pressure signals and provides a modulated pressure signal accordingly to control the motion of the primary floating disks in response thereto.

The combined movements of the primary floating disks within their housings between their closed and open positions, as described in more detail below, cause the ram chamber to be connected either to the pneumatic pressure supply system or to the pneumatic exhaust system, or alternatively, to become sealed off from either the supply or exhaust system.

The structure and operation of one particular embodiment of this invention is discussed more completely with reference to the accompanying drawings in which:

FIG. 1 shows a schematic diagram of an overall servo system utilizing pneumatic servo valves of the invention;

FIG. 2 shows a diagrammatic view of one embodiment of a valve of the invention as used in the servo system of FIG. 1;

FIG. 3 shows a plurality of wave forms used to describe the operation of the valve of FIG. 2;

Figure 4:
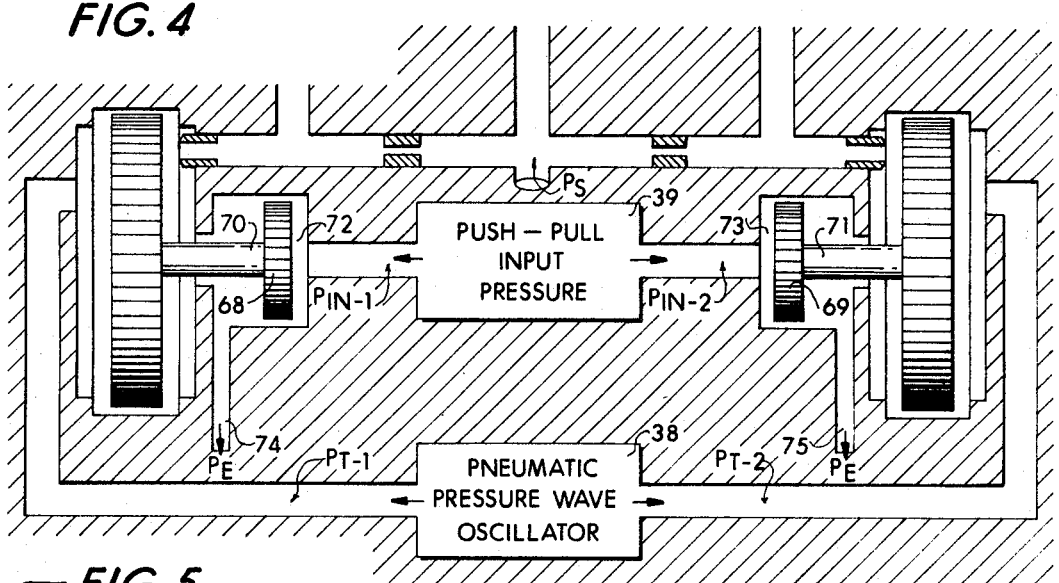
FIG. 4 shows an alternative embodiment of the servo valve of FIG. 2.

FIG. 1 shows a servo system 10 which comprises a movable ram 11 connected to a suitable load shown diagrammatically by dashed lines connected to block 12. Such a system may be used in one application to actuate a suitable control surface for an aerospace vehicle. For example, it may be connected to the elevator control surface of an aircraft, a missile, or other aerospace vehicle, so that an input command signal representing an automatic, or pilot-controlled, command to pitch upward, will cause ram 11 to move to the right, as shown in the figure. Through suitable mechanical couplings, movement of the ram causes the elevator surface to move through an appropriate angle so that the aircraft pitches in the specified upward direction in response thereto. Movement of the ram to the left correspondingly causes the elevator surface to move in the opposite angular direction to cause the aircraft to pitch in a downward direction. Central positioning of the ram causes the elevator surface to maintain its assumed position so that no further pitching motion of the aircraft occurs. This example, of course, illustrates only one application of such a servo system and others will occur to those skilled in the art for performing basically similar operations.

Movement of the ram is accomplished by supplying pneumatic pressure into either a first chamber 20 for movement of ram 11 to the right, or a second chamber 21 for movement of ram 11 to the left. The pneumatic pressure is supplied from a pneumatic pressure source 17 through a pair of valves, or pneumatic switches, 15 and 16. A pressure exhaust system 18 is also connected to the valves so that when one ram chamber is supplied with pneumatic pressure the other is connected to the exhaust system. Positioning of the valve distributor connections is determined by a pneumatic drive control system 14.

As diagrammatically illustrated by the dashed lines within the valve blocks 15 and 16, for the particular condition shown in the drawing, chamber 20 is connected to pressure source 17 via valve 15 while chamber 21 is connected to pressure exhaust 18 via valve 16. Valves 15 and 16 are each provided with a central position 19. When the valves are simultaneously switched to that position, chambers 20 and 21 are connected neither to the pressure source nor to the pressure exhaust and, thus, are essentially sealed off. A position command input signal (schematically shown as derived from block 13) is fed to pneumatic drive control system 14 via summation component 24. An appropriate sensor 22 may be utilized to measure the position of the ram (equivalently, the position of the load) and, thus, provide for a position feedback signal via feedback compensation component 23 which is compared with the command input signal in an appropriate and well-known fashion.

The system shown in FIG. 1 operates so that a positive position command input causes valve 15 to assume a position such that chamber 20 is connected to pressure source 17 and valve 16 to assume a position such that chamber 21 is simultaneously connected to pressure exhaust 18. Thus, a positive command input provides motion of the ram to the right. A negative command input similarly causes the valves to assume opposite positions relative to the source and exhaust systems so that the ram moves to the left. A zero command input causes the valve to assume a shut-off, or quiescent, position.

FIG. 2 shows a schematic diagram of one of the valves, or switches, shown in FIG. 1 constructed in accordance with this invention. As an example, valve 16 which is connected to ram chamber 21 in FIG. 1 is illustrated diagrammatically in FIG. 2. This valve consists of four "floating flapper disks" 26, 27, 30 and 31 (hereinafter referred to as FFD 26, FFD 27, FFD 30 and FFD 31, respectively). FFD 26 will be referred to as the exhaust primary FFD (floating flapper disk), FFD 27 will be referred to as the supply primary FFD, FFD 30 will be referred to as the exhaust secondary FFD and FFD 31 will be referred to as the supply secondary FFD. These disks consist of round, relatively thin elements which freely float inside housings 28, 29, 32, and 33, respectively, such housings having in each case slightly larger diameter and thickness than the disk itself. Due to the large diameter to thickness ratios of the disks, rotary motions of the disks do not affect their operation and cocking effects within the housing are essentially eliminated. Each disk is caused to translate back and forth a small distance by pressures acting on its end faces. The actuating pressures may originate from a single supply channel as, for example, channel 42 supplying the left-hand face of FFD 26, or from a plurality of channels as shown in association with the right-hand face of FFD 26. The shoulders at the outer periphery of each of the housings act as stops for the translational motion of the disks and also as sealing surfaces to prevent the passage of pressure fluids around the ends of the disk. Thus, when a disk is at either its hard over left or its hard over right extremities of position, no flow occurs around its outer periphery.

In operation each disk assumes a position hard over against either the left or the right shoulder. The use of disk elements such as those illustrated eliminates the necessity for using elastic flexures, bellows, diaphragms, springs, and the like. Such disk elements are essentially self-flushing so they are prevented from becoming unduly contaminated.

In the operation of valve 16 shown in FIG. 2, primary FFD's 26 and 27 are associated directly with ram chamber 21 and determine whether the ram chamber is in turn connected to pressure supply port 40 (thereby providing an input supply pressure, $P_s$), connected to pressure exhaust port 41 (thereby providing an output exhaust pressure, $P_E$) or sealed off from any connection with either the supply or the exhaust system. Secondary FFD's 30 and 31 control the positions of primary FFD's 26 and 27, respectively, and are in turn controlled by the combination of input signals, $P_{in-1}$ and $P_{in-2}$, as received from a suitable push-pull input pressure signal system 39, and signals $P_{T-1}$ and $P_{T-2}$ as received from a suitable pneumatic pressure wave oscillator 38.

When FFD 26 is hard over against the right shoulder of housing 26 and FFD 28 is hard over against the left shoulder of housing 29, ram chamber 21 is substantially sealed off so that it is connected neither to pressure port 40 nor to exhaust port 41.

When FFD 27 is hard over to the right, or open position, and FFD 26 is hard over to its right, or closed position, ram chamber 21 is connected to pressure supply port 40 and pressure $P_s$ causes the ram to move to the left. When FFD 26 is hard over to its left, or open position, and FFD 27 is hard over to its left, or closed position, ram chamber 21 is connected to pressure exhaust port 41. The valve operation is arranged so that under no conditions do primary FFD's 26 and 27 remain simultaneously in their open positions (i.e., FFD 26 is never in its left position at the same time FFD 27 is in its right position). Thus, the valve assumes one of three states corresponding to conditions under which the ram chamber is either sealed off, connected to supply pressure, or connected to exhaust output.

The position of FFD 26 is controlled by the pressure $P_{C-1}$ which exists in line 42, such pressure being in turn controlled by the position of FFD 30. When FFD 30 is hard over to its right position, $P_{C-1}$ charges up to supply pressure $P_s$ via line 43 through fixed orifice 34. Pressure $P_{C-1}$ thereby forces FFD 26 to its hard over right position which seals off the ram chamber from pressure exhaust port 41. If FFD 30 moves to its hard over left position, pressure $P_{C-1}$ is relieved and FFD 26 moves to its hard over left position, thereby connecting the ram chamber to pressure exhaust port 41. Thus, the position of FFD 30 controls the position of FFD 26.

In a similar manner, the position of FFD 27 is controlled by the position of FFD 31 and determines whether ram chamber 21 is connected to pressure supply port 40 or is sealed off. When FFD 31 moves to its right position, pressure $P_{C-2}$ in line 44 is relieved and FFD 27 moves to its hard over right position, thereby connecting ram chamber 21 to pressure supply port 40.

Secondary FFD's 30 and 31 operate esentially as pneumatic modulation systems, the positions of said FFD's being represented by output pulses, the pulse lengths of which are determined by the input signals supplied by push-pull input pressure system 39 and the pressure signals supplied by pneumatic pressure wave oscillator 38.

In order to understand the operation of such a pulse length modulation scheme, it is helpful to consider the wave form diagrams shown in FIG. 3, the amplitudes of which are plotted as a function of time. Wave forms 48 and 49, are triangular in configuration and are essentially opposite in phase, (i.e., they are out of phase by one-half of a period). They are produced by pneumatic pressure wave oscillator 38 in a manner more completely described with reference to my co-pending application, Ser. No. 553,983, filed May 31, 1966, entitled "Pneumatic Oscillator." Since the operation of such an oscillator is described in detail in such co-pending application, a description of its operation is omitted here. It is clear from the co-pending application, however, that such a pneumatic oscillator can produce simultaneous triangular pressure waves 48 and 49 which can be fed through lines 45 and 46 of the valve system of FIG. 2 to the left end face and right end face of FFD's 30 and 31, respectively.

A pair of input signals $P_{in-1}$ and $P_{in-2}$, are supplied to the right end face of FFD 30 and to the left end face of FFD 31, respectively. $P_{in-1}$, shown as wave form 50, and $P_{in-2}$, shown as wave form 51, are derived from a command input signal $P_{COM}$, shown as wave form 52, via a suitable push-pull pressure system 39 such that $$P_{COM} = P_{in-1} - P_{in-2}$$

Push-pull pressure system 39 may be a known type such as a flapper nozzle of the type described in the text "Fluid Power Control" by Blackburn, Reethof, and Shearer (M.I.T. Press, Cambridge, Mass., 1960), chapter 20. Any other known assemblies, such as pure fluid devices, jet pipe valves, and the like, can be used to generate the push-pull input signals from the input command signal within the scope of this invention and, therefore, the structure of input generator 39 will not be described in detail here.

Examination of the relationship between $P_{T-1}$ (waveform 48) and $P_{in-1}$ (waveform 50 in graph (a) at the top of FIG. 3) shows that, so long as $P_{T-1}$ is greater than $P_{in-1}$, FFD 30 remains hard over in its right position and the distance $X_1$ as measured from the right shoulder of housing 32 in the direction of the arrow shown in FIG. 2 remains zero. As soon as $P_{in-1}$ becomes greater than $P_{T-1}$, as it does between points 53 and 54 in FIG. 3, FFD 30 moves to its hard over left position so that $X_1$ is at its maximum value as shown by the initial pulse 57 in graph (c) of FIG. 3. After point 54, $P_{T-1}$ is again greater than $P_{in-1}$ until point 55 is reached and $X_1$ remains zero during that time period (FFD 30 moves back to its hard over right position). Between points 55 and 56 FFD 30 again moves to its left-hand position so that $X_1$ is again at its maximum value as shown by pulse 58. Similarly, a subsequent pulse 59 again shows movement of FFD 30 to its hard over left position between points 60 and 61.

Each time FFD 30 moves to its left position, FFD 26 moves to its left position so that ram chamber 21 is connected to exhaust port 41. Meanwhile, $P_{in-2}$ always remains less than $P_{T-2}$, as shown in graph (b) of FIG. 3, so that FFD 31 remains in its hard over left position and FFD 27 correspondingly is in its left position. In such case, $X_4$, as measured from the left shoulder of housing 33 in the direction of the arrow in FIG. 2 remains zero as shown in graph (d) of FIG. 3. As soon as $P_{in-2}$ becomes greater than $P_{T-2}$, as between points 62 and 63 of graph (b), FFD 31 moves to its hard over right position and $X_4$ is at a maximum value as represented by pulse 64 of graph (d). Similarly, pulse 65 is generated at a later point in time between points 66 and 67. When $X_4$ is in its hard over right position, FFD 27 is also in its hard over right position so that ram chamber 21 is directly connected to pressure supply port 40.

Thus, motion of the ram is controlled by the modulating action of FFD's 30 and 31 which in turn control the position of FFD's 26 and 27 so that ram chamber 21 is either connected to input supply port 40 (as during the time periods of negative command represented by pulses 64 and 65), connected to the exhaust port 41 (as represented by the time periods of positive command of pulses 57, 58, and 59), or sealed off from both supply port and exhaust port (as represented by the time periods when both $X_1$ and $X_4$ are equal to zero, corresponding to hard over right and hard over left positions of FFD's 30 and 31, respectively). At all times when the input command signal $P_{COM}$ is zero, the ram chamber is sealed off (i.e., both $X_1$ and $X_4$ are zero and no pulses occur) and no power is consumed from the pressure supply system.

The use of the two-stage system, as shown in FIG. 2, in which the motion of primary FFD's 26 and 27 are controlled by the motion of secondary FFD's 30 and 31 allows the low signal pressures to be decoupled from the high supply pressures (from the pneumatic pressure supply source via port 40) used to actuate the ram. Thus, the pressures exerted by pressure wave signals $P_{in-1}$, $P_{in-2}$, $P_{T-1}$ and $P_{T-2}$ are relatively small in comparison to supply pressure $P_s$ and the maximum values of pressures $P_{C-1}$ and $P_{C-2}$ which build up in channels 42 and 44.

A valve, or pneumatic switching system, similar to that shown in FIG. 2 can be used for valve 15 of FIG. 1. In that case pressure input signals, $P_{in-1}$ and $P_{in-2}$, are reversed so that the opposite action takes place in ram chamber 20. Thus, when ram chamber 21 is connected to the pressure supply port, ram chamber 20 is connected to the pressure exhaust port and the ram moves to the left. When ram chamber 21 is connected to the pressure exhaust port, ram chamber 20 is connected to the pressure supply port so that ram moves to the right. In accordance with FIG. 3 the distance and direction which ram 11 moves depends on the amplitude and direction of input command signal 52 which in turn determines the length of output position pulses 57, 58, 59, 64 and 65 representing motions of the control secondary FFD's, such as FFD's 30 and 31 of FIG. 2 and similar corresponding FFD's located in valve 15.

It should be noted that triangular pressure wave oscillator 38 has very little loading since there is essentially no leakage path when secondary FFD's 30 and 31 are against either of their shoulders. Therefore, distortion of the triangular pressure wave form tends to be extremely small. If input pressures, $P_{in-1}$ and $P_{in-2}$, are applied directly to the end faces of secondary FFD's 30 and 31 as shown in FIG. 2 under many practical operating conditions such input pressures should not be strongly influenced by the discharge of pressures $P_{C-1}$ and $P_{C-2}$ when $X_1$ and $X_4$ are non zero. Thus, for most cases there are no unduly large fluctuations in the push-pull input pressure of the system which would tend to cause its operation to deteriorate.

However, under certain operating conditions, where the flows that determine the input pressures, $P_{in-1}$ and $P_{in-2}$, are not sufficiently large to overcome the fluctuating effects of the flow through fixed orifices 34 and 35, the system shown in FIG. 2 may require modification to eliminate such fluctuations. Such modification is shown in FIG. 4 where the input pressure signals are not applied directly to the end faces of secondary FFD's 30 and 31, as they are in FIG. 2. For simplicity FIG. 4 only reproduces the corresponding bottom portion of the valve shown in FIG. 2. In such modification $P_{in-1}$ and $P_{in-2}$ are applied to the end faces of FFD's 30 and 31, respectively, via auxiliary disks 68 and 69, within housings 72 and 73, which disks are rigidly connected to FFD's 30 and 31 by shafts 70 and 71, respectively. The use of such auxiliary disks decouples the input signal pressures from the effects of the fluctuating pressures $P_{C-1}$ and $P_{C-2}$ and effectively reduces the undesirable effects which may occur where the input pressure flows may be significantly lower than the flows through orifices 34 and 35. Auxiliary exhaust ports 74 and 75 are used as shown in the alternative embodiment of FIG. 4 in order to provide an outlet for the flows from $P_{C-1}$, $P_{C-2}$, $P_{in-1}$, and $P_{in-2}$.

The speed of response of the servo-valve of this invention depends essentially on the switching times of the floating flapper disks used therein. Such switching times are largely governed by the distances the disks must move, the size of the volumes which must be charged and discharged, the minimum values of the actuating pressures involved, and the mass flow rates used in charging and discharging the various volumes. The overall size of the valve depends on the flow area and supply pressure necessary to deliver the required rated power of the device for the application in which it is to be used.

While the response time for a system of a given size can be reduced by increasing the mass flow rates discussed above during the switching processes, such a procedure may tend to reduce the power gain or amplification of the overall device. For most effective operation the switching power of the device that is necessary to achieve an acceptable switching time should be substantially less than the output power of the overall servo valve. At the same time the flow rates that establish the differential input pressures on secondary FFD's 30 and 31, for example, should be significantly larger than the flow rate through orifices 34 and 35 so that the discharge of $P_s$ will not disrupt the input pressures (if the embodiment of FIG. 2 is used). It has been found that switching time of the order of one millisecond is feasible under acceptable power expenditure requirements.

Figure 5:
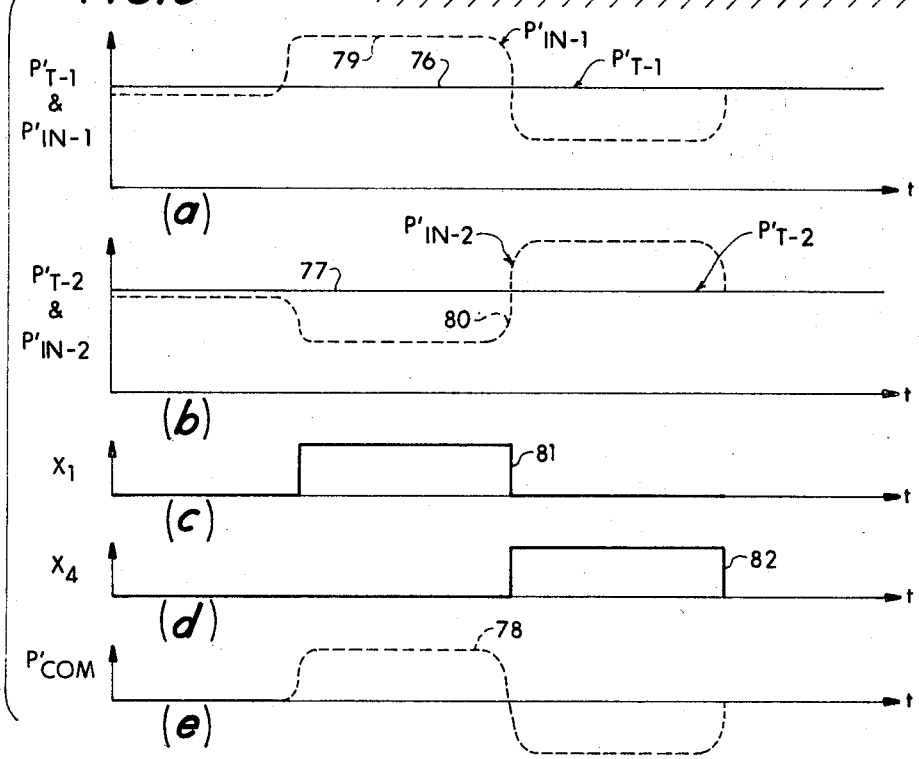
FIG. 5 shows an alternative modulation scheme for use in the servo valve of the invention.

Another alternative embodiment of the modulation scheme of this invention is represented by the wave forms shown in FIG. 5. In that figure, the wave forms $P'_{T-1}$ and $P'_{T-2}$ are constant pressure signals identified as wave forms 76 and 77. Such a system operates essentially as a "bang-bang" system, that is either FFD 30 or FFD 31 is essentially in its open position (hard over left or hard over right, respectively) depending on the input command signal $P'_{COM}$, shown as wave form 78. On positive command signals $P'_{in-1}$ (wave form 79) is greater than the constant level of wave form 76 and FFD 30 moves to its left position. On negative command signals, $P'_{in-2}$ (wave form 80) is greater than the constant level of wave form 77 and FFD 31 moves to its right position. When $P'_{COM}$ is below the threshold level of wave forms 76 and 77, FFD's 30 and 31 are closed and the ram is sealed off from pressure supply and pressure exhaust ports. Such a simplified system may be useful in some applications and represents a feasible alternative modulation scheme within the scope of this invention.

Although the above invention can be successfully used as a pneumatically operated device it is not necessarily limited thereto and may be operated in some instances as a hydraulically operated device within the scope of the invention. Moreover the floating disk structures shown in the preferred embodiment of the invention may be replaced by flapper elements one end of which may be flexibly attached to the housing so that such elements may still be capable of controlled motion within the housing in accordance with the above description. Hence, the invention is not to be construed as limited to the particular system shown and described herein except as defined by the appended claims.

What is claimed is:

1. A valve for controlling the supply of pressure from a pressure system to an outlet port of said valve, said valve comprising, in combination, first movable means, means for generating a pair of pressure wave signals having specified pressure wave shapes as a function of time, means for providing a pair of input pressure signals in response to an input command signal, connecting means for feeding said pressure wave signals and said input pressure signals to said first movable means for moving said first movable means in response thereto, second movable means connected to said first movable means and to said pressure system and responsive to the motion of said first movable means for controlling the supply of pressure from said pressure system to said outlet port.

2. A valve in accordance with claim 1 in which said pressure wave signals have triangular wave shapes and said pair of input pressure signals have a push-pull relationship.

3. A valve in accordance with claim 1 in which said pressure wave signals have constant pressure wave shapes.

4. A servo valve for controlling the supply of pressure from a pressure system to an outlet port of said valve, said valve comprising, in combination, a first pair of movable control means, means for generating a pair of pressure signals having triangular pressure wave shapes as a function of time, means for providing a pair of input pressure signals in response to an output command signal, connecting means for feeding one of said input signals and one of said triangular pressure wave signals to one of said first pair of movable control means to move said control means in response thereto, connecting means for feeding the other of said input signals and the other of said triangular pressure wave signals to the other of said first pair of movable control means to move said control means in response thereto, a second pair of movable control means connected to said first pair of movable control means and to said pressure system and responsive to the motions of said first pair of movable control means for controlling the supply of pressure from said pressure system to said outlet port.

5. A servo valve for controlling the supply of pressure from a pneumatic pressure system to an outlet port of said valve, said valve comprising, in combination, a first pair of movable control means, means for generating a pair of pneumatic pressure signals having triangular pressure wave shapes as a function of time, means for providing a pair of push-pull pneumatic input pressure signals in response to an input command signal, connecting means for feeding one of said input pressure signals and one of said triangular pressure wave signals to one of said first pair of movable control means to move said control means in response thereto, connecting means for feeding the other of said input pressure signals and the other of said triangular pressure wave signals to the other of said first pair of movable control means to move said control means in response thereto, a second pair of movable control means connected to said first pair of movable control means and to said pressure system and responsive to the motions of said first pair of movable control means for controlling the supply of pneumatic pressure from said pressure system to said outlet port.

6. A servo valve in accordance with claim 5 in which said first pair of movable control means comprises a pair of floating flapper disks.

7. A servo valve in accordance with claim 6 in which said second pair of movable control means comprises a pair of floating flapper disks.

8. A valve for controlling the supply of pressure from a pressure system to an outlet port of said valve, said valve comprising, in combination, a first pair of movable control means, means for generating a pair of triangular pressure wave signals, means for generating a pair of input pressure signals in response to an input command signal, movable auxiliary means rigidly attached to each of said first pair of movable control means, connecting means for feeding one of said input pressure signals to one of said movable auxiliary means and for feeding one of said triangular pressure wave signals to one of said first pair of movable control means to move one of said movable control means in response thereto, connecting means for feeding the other of said input pressure signals to the other of said movable auxiliary means and the other of said triangular pressure wave signals to the other of said first pair of movable control means to move the other of said movable control means in response thereto, a second pair of movable control means connected to said first pair of movable control means and to said pressure system and responsive to the motions of said first pair of movable control means for controlling the supply of pressure from said pressure system to said outlet port.

References Cited

UNITED STATES PATENTS

| | | | |
|---|---|---|---|
| 2,836,154 | 6/1958 | Lantz | 137—625.62 |
| 2,984,218 | 5/1961 | Christianson | 137—596.15 |
| 3,096,690 | 7/1963 | Hayner | 91—461 |
| 3,160,071 | 12/1964 | Kandelman | 137—82 X |

HENRY T. KLINKSIEK, *Primary Examiner.*